US011921304B2

(12) United States Patent
Chibana et al.

(10) Patent No.: US 11,921,304 B2
(45) Date of Patent: Mar. 5, 2024

(54) POLYGON MIRROR, DEFLECTION DEVICE, OPTICAL SCANNING APPARATUS AND IMAGE FORMING APPARATUS

(71) Applicant: CANON KABUSHIKI KAISHA, Tokyo (JP)

(72) Inventors: Takahito Chibana, Tochigi (JP); Genichiro Kudo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/716,196

(22) Filed: Apr. 8, 2022

(65) Prior Publication Data

US 2022/0334296 A1 Oct. 20, 2022

(30) Foreign Application Priority Data

Apr. 16, 2021 (JP) .................................. 2021-069963

(51) Int. Cl.
| | |
|---|---|
| *G03G 15/043* | (2006.01) |
| *G02B 1/14* | (2015.01) |
| *G02B 5/09* | (2006.01) |
| *G02B 26/08* | (2006.01) |
| *G02B 26/12* | (2006.01) |

(52) U.S. Cl.
CPC ................. *G02B 5/09* (2013.01); *G02B 1/14* (2015.01); *G02B 26/0816* (2013.01); *G02B 26/121* (2013.01); *G03G 15/043* (2013.01)

(58) Field of Classification Search
CPC ........ G02B 1/14; G02B 5/09; G02B 26/0816; G02B 26/12; G02B 26/121; G03G 15/04036; G03G 15/043
See application file for complete search history.

(56) References Cited

U.S. PATENT DOCUMENTS

| | | | |
|---|---|---|---|
| 4,826,271 A | 5/1989 | Takahashi et al. | |
| 8,174,748 B2* | 5/2012 | Andoh | G02B 5/08 |
| | | | 359/208.1 |
| 10,451,779 B2 | 10/2019 | Kurita et al. | |
| 2017/0205544 A1* | 7/2017 | Kurita | G02B 5/0808 |
| 2019/0322022 A1 | 10/2019 | Ohta et al. | |

FOREIGN PATENT DOCUMENTS

| | | |
|---|---|---|
| JP | 1-120120 U | 8/1989 |
| JP | 10-96872 A | 4/1998 |
| JP | 2005-338730 A | 12/2005 |
| JP | 2016-031470 A | 3/2016 |

* cited by examiner

*Primary Examiner* — Hoang X Ngo
(74) *Attorney, Agent, or Firm* — Venable LLP

(57) ABSTRACT

A polygon mirror includes: a base body having a plurality of side surfaces, a first surface adjacent to the plurality of side surfaces, and a second surface adjacent to the plurality of side surfaces and opposite to the first surface; and a film formed on the plurality of side surfaces and extending from the plurality of side surfaces over the first surface and the second surface, wherein the film includes: a first region formed on the first surface along the plurality of side surfaces; a second region formed on the second surface along the plurality of side surfaces, and wherein a first volume of the first region and a second volume of the second region are different from each other.

20 Claims, 8 Drawing Sheets

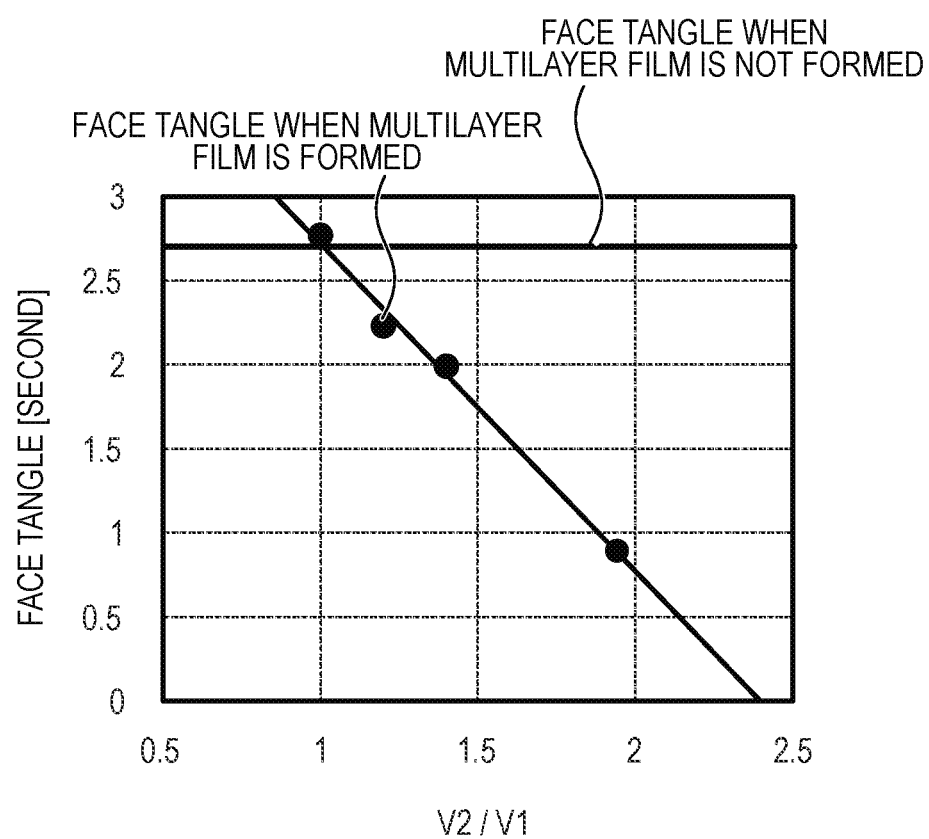

POLYGON MIRROR, DEFLECTION DEVICE, OPTICAL SCANNING APPARATUS AND IMAGE FORMING APPARATUS

BACKGROUND OF THE INVENTION

Field of the Invention

The present invention relates to a polygon mirror, a deflection device, an optical scanning apparatus and an image forming apparatus.

Description of the Related Art

An optical scanning apparatus used in an image forming apparatus such as a laser beam printer reflects a light beam such as a laser beam by a polygon mirror and performs optical scanning by high-speed rotation of the polygon mirror. The scanning light thus obtained is imaged on the surface of a rotating photosensitive drum to form an electrostatic latent image. Next, the image is formed by transferring the toner image formed by the developing device from the electrostatic latent image on the surface of the photosensitive drum to a recording material.

Japanese Patent Application Laid-Open No. H10-096872 discloses a deflection scanning apparatus used in such an image forming apparatus. In the apparatus disclosed in Japanese Patent Publication Laid-Open No. H10-096872, a rotary polygon mirror has a center hole which is a shaft hole for inserting a shaft integrally connected to a rotor constituting a motor. The rotary polygon mirror is pressurized to the rotor by a pressing spring, which is pressing means attached to the upper end of the shaft, and is integrally connected to the rotor.

Among polygon mirrors, individual differences can occur since there is a mixture of polygon mirrors that bend to the upper surface side, polygon mirrors that bend to the lower surface side, and polygon mirrors that do not bend.

SUMMARY OF THE INVENTION

It is therefore an object of the present invention to provide a technology which is advantageous in reducing individual differences in polygon mirrors. It is also an object of the present invention to provide a technology which is advantageous for improving the quality of a deflection device, an optical scanning apparatus and an image forming apparatus using a polygon mirror.

According to one aspect of the present invention, there is provided a polygon mirror includes: a base body having a plurality of side surfaces, a first surface adjacent to the plurality of side surfaces, and a second surface adjacent to the plurality of side surfaces and opposite to the first surface; and a film formed on the plurality of side surfaces and extending from the plurality of side surfaces over the first surface and the second surface, wherein the film includes: a first region formed on the first surface along the plurality of side surfaces; and a second region formed on the second surface along the plurality of side surfaces, and wherein a first volume of the first region and a second volume of the second region are different from each other.

According to another aspect of the present invention, there is provided a polygon mirror including: a base body having a plurality of side surfaces, a first surface adjacent to the plurality of side surfaces, and a second surface adjacent to the plurality of side surfaces and opposite to the first surface; and a film formed on the plurality of side surfaces and extending from the plurality of side surfaces over the either one of the first surface and the second surface, wherein the base body is made of a resin.

According to another aspect of the present invention, there is provided a deflection device including: the polygon mirror described above; a driving unit configured to rotate the polygon mirror about an axis passing through a center of the first surface and a center of the second surface as a rotation center; and a fixing unit that fixes the polygon mirror to the driving unit with the second surface facing the driving unit.

According to another aspect of the present invention, there is provided an optical scanning apparatus including: the deflection device described above configured to deflect a light beam to scan a surface to be scanned in a main scanning direction; and an imaging optical system configured to guide the light beam deflected by the deflection device to the surface to be scanned.

According to another aspect of the present invention, there is provided an image forming apparatus including: the optical scanning apparatus described above; a developing unit configured to develop an electrostatic latent image formed on the surface to be scanned by the optical scanning apparatus as a toner image; a transfer unit configured to transfer the developed toner image to a material to be transferred; and a fixing unit configured to fix the transferred toner image to the material to be transferred.

According to another aspect of the present invention, there is provided an image forming apparatus including: the optical scanning apparatus described above; and a printer controller configured to convert a signal outputted from an external apparatus into image data and input the image data to the optical scanning apparatus.

Further features of the present invention will become apparent from the following description of exemplary embodiments with reference to the attached drawings.

BRIEF DESCRIPTION OF THE DRAWINGS

FIG. 7 is a view showing the results of consideration of examples of the present invention.

DESCRIPTION OF THE EMBODIMENTS

Hereinafter, embodiments of the present invention will be described in detail with reference to the drawings.

First Embodiment

A polygon mirror, a deflection device, and an optical scanning apparatus according to a first embodiment of the present invention will be described with reference to FIG. 1 to FIG. 5B.

Figure 1:
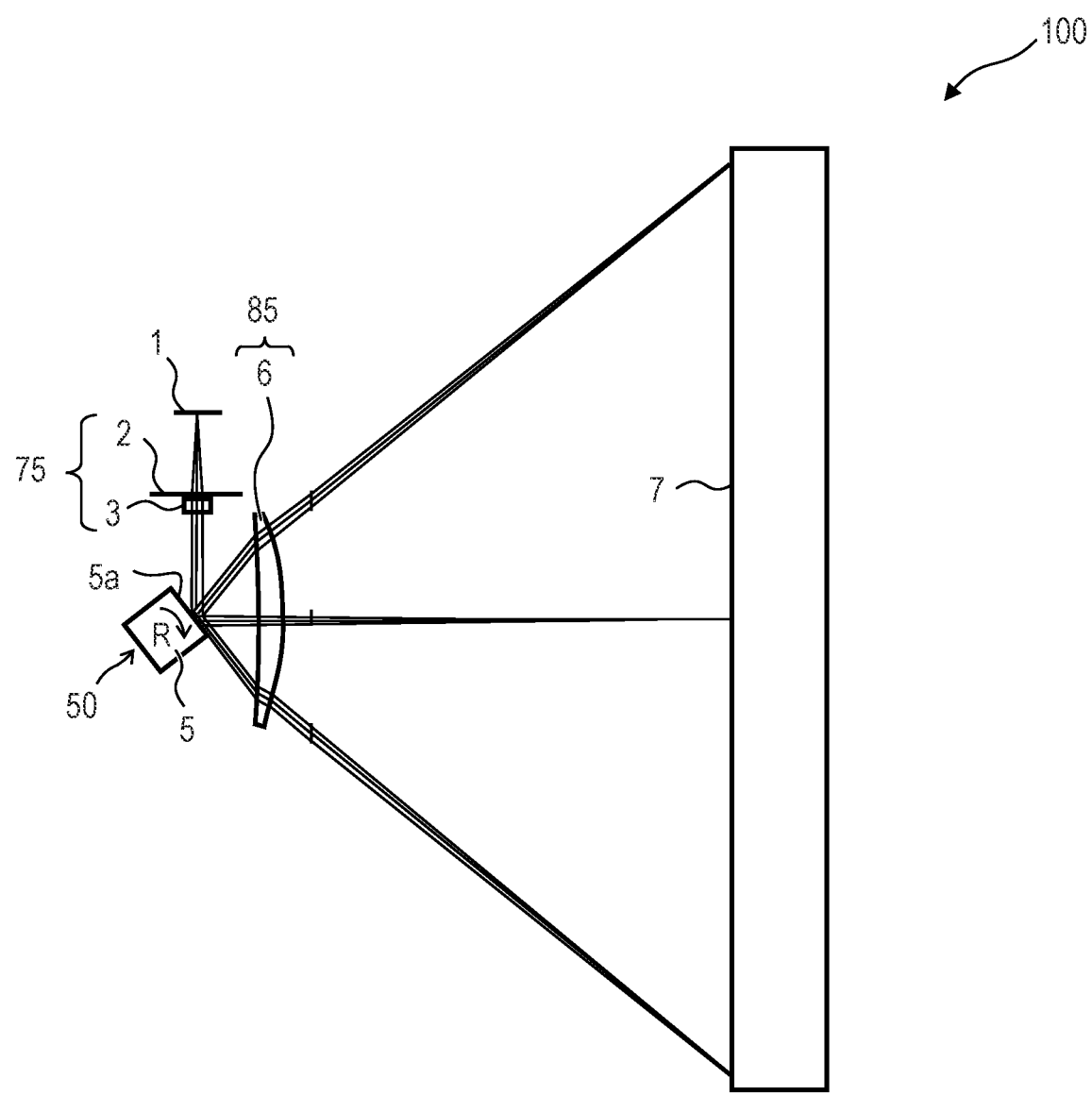
FIG. 1 is a schematic main scanning cross-sectional view of an optical scanning apparatus including a polygon mirror according to a first embodiment of the present invention.

FIG. 1 is a schematic main scanning cross-sectional view of the optical scanning apparatus 100 according to the first embodiment. The optical scanning apparatus 100 includes a light source 1, a diaphragm 2, an anamorphic collimator lens 3, a deflection device 50 and a scanning lens 6. The optical scanning apparatus 100 includes a mirror (not shown).

The light source 1 is composed of a semiconductor laser having a light emitting point. The diaphragm 2 is an aperture diaphragm having an elliptical opening, and regulates the luminous flux width in the main scanning direction and the sub scanning direction of the luminous flux emitted from the light source 1. The anamorphic collimator lens 3 converts the luminous flux passing through the diaphragm 2 to make the luminous flux become a weakly convergent luminous flux in the main scanning direction and a convergent luminous flux in the sub scanning direction. That is, the anamorphic collimator lens 3 is composed of anamorphic lenses having different powers in the main scanning cross section and the sub scanning cross section. The anamorphic collimator lens 3 is formed of, for example, a plastic mold.

As described above, in the optical scanning apparatus 100, the diaphragm 2 and the anamorphic collimator lens 3 constitute an incident optical system 75.

In the optical scanning apparatus 100, the deflection device 50 has a polygon mirror 5 described later, which is, for example, a four-face polygon mirror having a circumscribed circle diameter of 20 mm. The deflection device 50 deflects and scans the light beam passing through the incident optical system 75 by rotating the polygon mirror 5 which is a deflector at a constant speed in the direction of an arrow R by driving means such as a motor (not shown).

The scanning lens 6 is an fθ lens having approximately fθ characteristics, and guides the light beam deflected by the deflection device 50 onto a surface 7 to be scanned to form a spot in the image region of the surface 7 to be scanned. The scanning lens 6 brings a substantially conjugate relationship between the deflection surface (reflecting surface) 5a of the polygon mirror 5 or its vicinity and the surface 7 to be scanned or its vicinity in the sub scanning cross section. Thus, tilting correction of the deflection surface 5a of the polygon mirror 5 in the deflection device 50 is performed. In the optical scanning apparatus 100, the scanning lens 6 constitutes an imaging optical system 85.

With the configuration described above, in the optical scanning apparatus 100, when the light beam that has optically modulated by the light source 1 according to the image information to be emitted passes through the diaphragm 2, the widths of the light beam in the main scanning direction and the sub scanning direction are limited by the opening of the diaphragm 2. The light beam passing through the diaphragm 2 is converted into a light beam having different convergence degrees in the main scanning section and the sub scanning section by the anamorphic collimator lens 3. Further, the light beam is focused so that an image of a substantially focal line (a line image long in the main scanning direction) is formed on the deflection surface 5a of the polygon mirror 5 in the deflection device 50.

The light beam reflected and deflected by the deflection surface 5a of the polygon mirror 5 is focused on the surface 7 to be scanned in a spot shape by the scanning lens 6, and the surface 7 to be scanned is optically scanned at substantially the same speed in the main scanning direction by rotating the polygon mirror 5 in the direction of the arrow R. Thus, image recording is performed on the photosensitive drum surface as a recording medium disposed at the position of the surface 7 to be scanned.

When the light scanning is performed on the surface 7 to be scanned, it is necessary to determine a scanning start timing on the surface 7 to be scanned. Therefore, in the optical scanning apparatus 100, the light beam reflected and deflected in a predetermined direction by the deflection device 50 is guided by a BD (Beam Detect) lens (not shown) onto a BD sensor (not shown). A control unit (not shown) uses a synchronization signal (BD signal) acquired by detecting an output signal from the BD sensor to determine a light emission timing of the light emission point of the light source 1 for starting scanning in the image recording on the surface 7 to be scanned.

Figure 2:
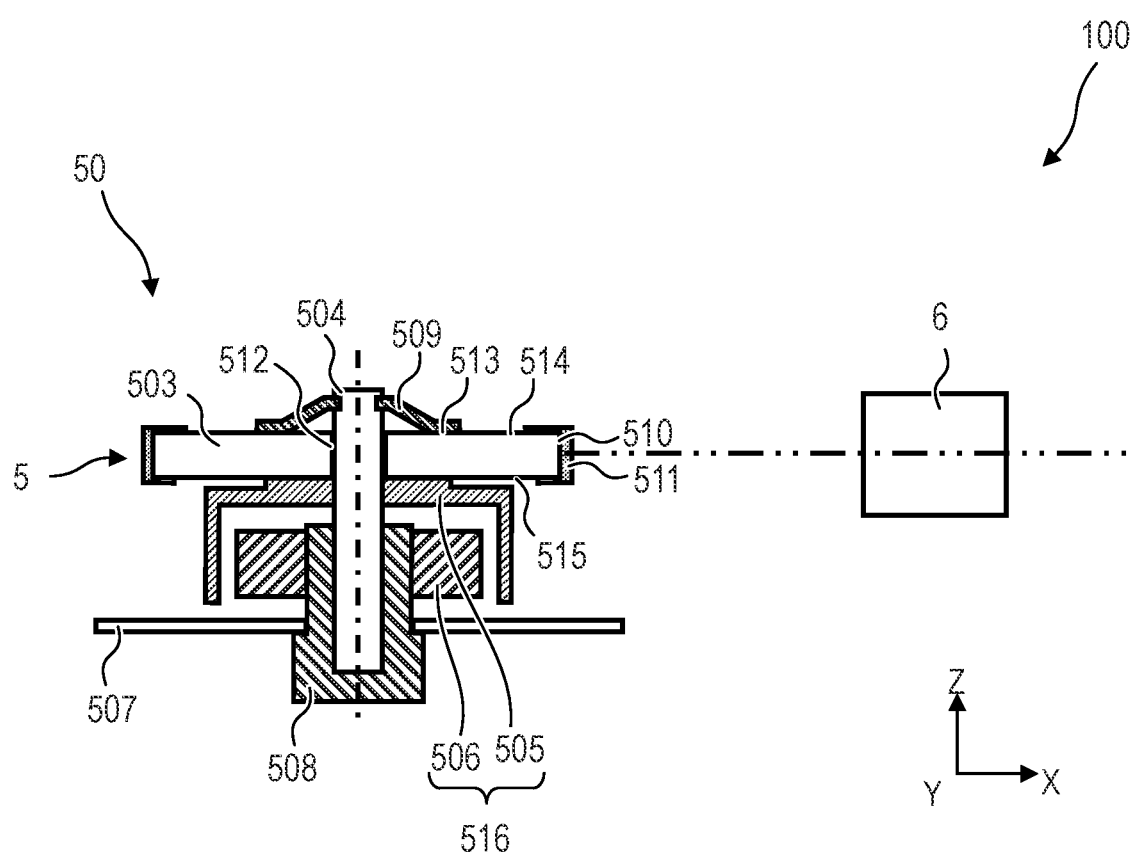
FIG. 2 is a schematic diagram of a deflection apparatus in the optical scanning apparatus according to the first embodiment of the present invention.

Next, the deflection device 50 in the optical scanning apparatus 100 according to the present embodiment will be described with reference to FIG. 2. FIG. 2 is a schematic structural view of the deflection device 50 in the optical scanning apparatus 100 according to the present embodiment, and illustrates a ZX cross section that is a cross section along the Z direction, which is a sub scanning direction including the optical axis.

As illustrated in FIG. 2, the optical scanning apparatus 100 includes the deflection device 50, the scanning lens 6, the light source 1 (see FIG. 1), a collimator lens such as the anamorphic collimator lens 3 (see FIG. 1), and the like, as described above. The elements constituting the optical scanning apparatus 100 are arranged in a housing (not shown).

The deflection device 50 is a polygon motor unit and has the polygon mirror 5, a rotating shaft 504, a rotor 505, a stator 506, a substrate 507, a bearing device 508, and a pressing spring 509 which is an elastic member for fixing the polygon mirror 5.

The rotor 505 is integrally coupled to the rotating shaft 504 along the Z-direction passing through the center of the rotor 505. The rotating shaft 504 is supported by the bearing device 508 so as to be rotatable about a central axis along the Z direction. The rotor 505 is a rotating part rotating with the rotating shaft 504 as a rotation center. The bearing device 508 is attached to the substrate 507 and integrated with the substrate 507. The polygon mirror 5 is attached and fixed to the rotor 505 by the pressing spring 509 as will be described later.

The stator 506 is fixed to the outer periphery of the bearing device 508 so as to face the rotor 505. The stator 506 constitutes a driving motor 516 together with the rotor 505. The driving motor 516 is a driving unit for rotating the polygon mirror 5. The driving motor 516 is driven when a current is supplied to the stator 506. The polygon mirror 5 receives rotational force by magnetic force or the like generated between the rotor 505 and the stator 506 in the driven driving motor 516, and rotates together with the rotor 505 with the rotating shaft 504 as a rotation center.

The polygon mirror 5 is formed in an outer shape of a polyhedron having a plurality of the deflection surfaces 5a described above. That is, the base body 503 of the polygon mirror 5 has a plurality of side surfaces 510, an upper surface 514 adjacent to the plurality of side surfaces 510, and a lower surface 515 adjacent to the plurality of side surfaces 510 and opposite to the upper surface 514. One of the upper surface 514 and the lower surface 515 may be referred to as a first surface and the other as a second surface.

Specifically, the base body 503 of the polygon mirror 5 is formed of, for example, a regular prism having a plurality of side surfaces 510, an upper surface 514 and a lower surface 515. In this case, the upper surface 514 and the lower surface 515 are parallel regular polygonal bases of the regular prism facing each other in the Z direction. The plurality of side surfaces 510 are a plurality of rectangle side surfaces in the regular prism.

The base body 503 of the polygon mirror 5 is made of a resin material such as cycloolefin resin, polycarbonate resin, acrylic resin, or the like. Note that the base body 503 is not limited to that made of a resin material, but may be made of another material such as a metal material, a glass material or the like, or may be made of a reflector that reflects light.

In the polygon mirror 5 according to the present embodiment, the base body 503 is formed on a flat square prism which is a hexahedron by resin molding, and has four rectangular side surfaces 510. The outer shape of the base body 503 is not limited to a hexahedron, and may be a polyhedron other than a hexahedron, such as a regular prism such as a regular pentagonal prism, a regular hexagonal prism, or the like. The number of the side surfaces 510 may be a plurality other than 4 depending on the outer shape of the base body 503. The outer shape of the base body 503 is not limited to the polyhedron itself, and may be a shape partially modified to the polyhedron or a shape other than the polyhedron as long as the shape has a plurality of side surfaces 510 circumferentially around the center of rotation.

A multilayer film 511 is formed to be provided on the plurality of side surfaces 510 by using a vacuum evaporation method, a sputtering method, or the like. The multilayer film 511 is a reflecting film that reflects laser beam as light emitted from the light source 1. The multilayer film 511 is formed on each side surface 510 and extends from the top of the plurality of side surfaces 510 over the upper surface 514 and the lower surface 515. A reflecting layer 521 included in the multilayer film 511, which will be described later, has a reflecting surface that functions as the above-described deflection surface 5a for reflecting light emitted from the light source 1. When the base body 503 of the polygon mirror 5 is made of a reflector, the side surface 510 can function as a reflecting surface. In this case, instead of the multilayer film 511 including the reflecting layer 521, a protecting film having no reflecting function can be formed asymmetrically in the same manner as the multilayer film 511. In this way, in the polygon mirror 5, the multilayer film 511 formed on the side surface 510 of the base body 503 or the side surface 510 of the base body 503 that is a reflector can constitute the reflecting surface of the polygon mirror 5.

The base body 503 of the polygon mirror 5 has a center hole 512 as a rotation center for fitting the rotating shaft 504 therein. The center hole 512 penetrates the base body 503 in the Z direction so as to communicate between the center of the upper surface 514 and the center of the lower surface 515. The rotating shaft 504, which is a shaft passing through the center of the upper surface 514 and the center of the lower surface 515 and serves as a rotation center, is inserted into the center hole 512 to be fitted in the center hole 512.

The base body 503 of the polygon mirror 5 includes a region 513 on the upper surface 514 which is pressurized by the pressing spring 509 mounted on the upper end of the rotating shaft 504. The polygon mirror 5 is fixed by being pressurized to the rotor 505 in the circumferential region 513 around the center hole 512 by the pressing spring 509 mounted on the rotating shaft 504 fitted in the center hole 512, and is integrally coupled with the rotating shaft 504 and the rotor 505.

In this way, the polygon mirror 5 is pressurized at the region 513 of the upper surface 514 by the pressing spring 509 which is a fixing unit with the lower surface 515 facing the rotor 505 of the driving motor 516 to be fixed to the rotor 505. Note that the polygon mirror 5 can be fixed to the rotor 505 by using an elastic member as the fixing unit instead of the pressing spring 509, or the polygon mirror 5 can be fixed to the rotor 505 by an appropriate fixing method using a member or the like other than the elastic member as the fixing unit.

The laser beam emitted from the light source 1 is condensed in the sub scanning direction by the anamorphic collimator lens 3 or the like and limited to a prescribed beam diameter. The laser beam is deflected by the polygon mirror 5 rotated and driven by the deflection device 50 with the rotating shaft 504 along the Z direction as the rotation center, passes through the scanning lens 6, and then the laser beam is condensed on the surface 7 to be scanned of an image bearing member (not shown), and is scanned in the Y direction to form an electrostatic latent image.

Figure 3A:
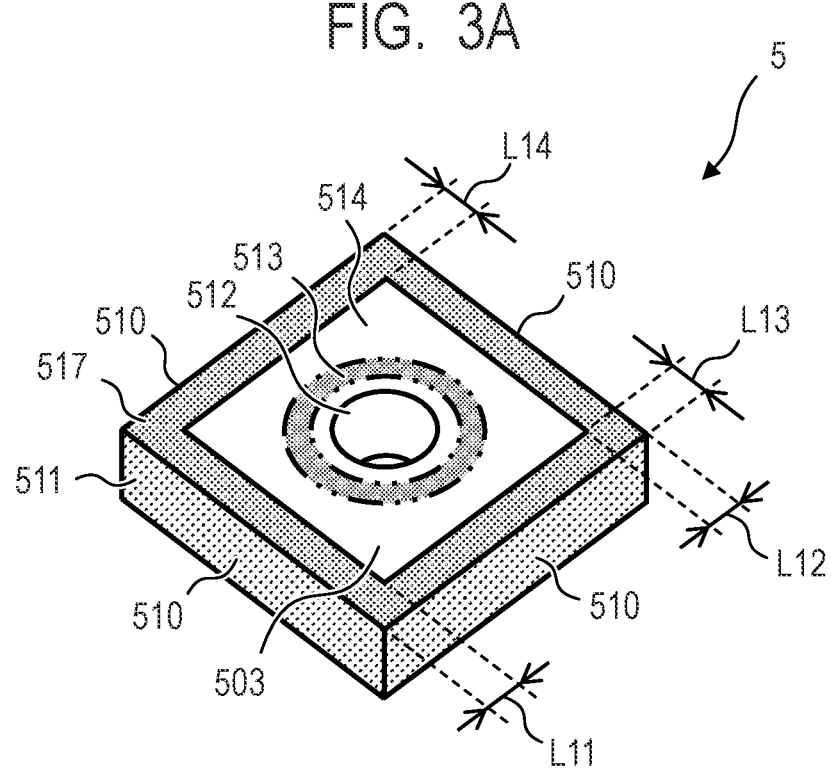
FIG. 3A is a perspective view of a polygon mirror according to the first embodiment of the present invention.
Figure 3B:
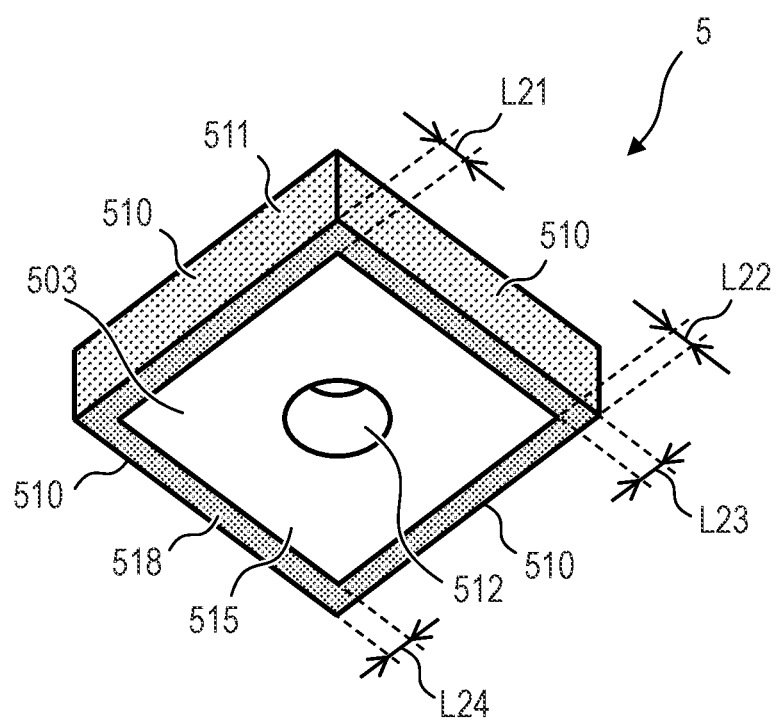
FIG. 3B is a perspective view of the polygon mirror according to the first embodiment of the present invention.

Next, the polygon mirror 5 used in the optical scanning apparatus 100 according to the present embodiment will be described in detail with reference to FIG. 3A and FIG. 3B. FIG. 3A is a perspective view of the polygon mirror 5 from above, and FIG. 3B is a perspective view of the polygon mirror 5 from below. In the polygon mirror 5 illustrated in FIG. 3A and FIG. 3B, the base body 503 has an outer shape of a regular square prism, and has the square upper surface 514 and the square lower surface 515, and the four rectangular side surfaces 510.

As illustrated in FIG. 3A, the multilayer film 511 is formed from the top of the side surface 510 to the top of the upper surface 514. The multilayer film 511 has a first region 517 formed on the upper surface 514. The first region 517 of the multilayer film 511 is formed on the periphery edge of the upper surface 514 along the plurality of side surfaces 510 at a certain distance from the side surface 510. Assuming that the volume of the first region 517 of the multilayer film 511 is V1, the volume V1 is determined by the thickness of the multilayer film 511 of the first region 517, the lengths L11 to L14 from the four side surfaces 510 to the inner end of the first region 517, and the shape of the base body 503 of the polygon mirror 5.

On the upper surface 514, the region 513 pressurized by the pressing spring 509 is formed in an annular shape around the center hole 512. Note that, in FIG. 3A, although the region 513 to be pressurized is provided on the same surface as the upper surface 514, the region 513 to be pressurized is not necessarily provided on the same surface as the upper surface 514. The area 513 to be pressurized may be formed to have a step with the upper surface 514. By forming the step between the area 513 to be pressurized and the upper surface 514, the area 513 to be pressurized becomes easy to be visually recognized, and the risk of mistakenly damaging during transportation or installation can be reduced. The region 513 to be pressurized may be formed discretely on the same circumference. By forming the region 513 discretely, the area of the pressurized region 513 requiring accuracy is reduced, and thus the risk of damaging the polygon mirror 5 can be further reduced.

As illustrated in FIG. 3B, the multilayer film 511 is formed from the top of the side surface 510 to the top of the lower surface 515. The multilayer film 511 has a second region 518 formed on the lower surface 515. The second region 518 of the multilayer film 511 is formed on the peripheral edge of the lower surface 515 along the plurality of side surfaces 510 at a certain distance from the side surface 510. Assuming that the volume of the second region 518 of the multilayer film 511 is V2, the volume V2 is determined by the thickness of the multilayer film 511 of the second region 518, the lengths L21 to L24 from the four side surfaces 510 to the inner end of the second region 518, and the shape of the base body 503 of the polygon mirror 5.

The multilayer film 511 is configured such that the volume V1 of the first region 517 and the volume V2 of the second region 518 are different from each other. By configuring the multilayer film 511 in this way, the polygon mirror 5 can be easily warped to either one of the upper surface 514 and the lower surface 515. Thus, the individual differences of the polygon mirrors 5 can be reduced. According to the present embodiment, since the individual differences of the polygon mirrors 5 can be reduced, the dispersion of the reflection characteristics of the polygon mirrors 5 can be reduced.

Further, in the present embodiment, the face tangle of the reflecting surface generated when the polygon mirror 5 is pressurized to be fixed to the rotor 505 can be reduced by using the compressive stress or the tensile stress which the multilayer film 511 has. The face tangle of the reflecting surface can be caused by deformation when the polygon mirror 5 is fixed to the rotor 505 as follows.

That is, since the polygon mirror 5 is fixed by being pressurized to the rotor 505 by the pressing spring 509, when the polygon mirror 5 is fixed without forming the multilayer film 511, deformation that causes the face tangle of the reflecting surface can occur. When the face tangle of the reflecting surface becomes large, the light reflected by the reflecting surface deviates, and therefore, for example, when the optical scanning apparatus 100 is used in an image forming apparatus which is a printer as will be described later, the light beam is obliquely incident on the surface of the photosensitive drum to generate a focus deviation. As a result of the occurrence of the focus deviation, the spot of the light beam is enlarged to cause deterioration of the image.

In contrast, in the present embodiment, the multilayer film 511 has a compressive stress or a tensile stress. Therefore, the volumes V1 and V2 of the multilayer film 511 are configured so as to be different from each other, whereby the resultant force of the force acting on the upper surface 514 and the force acting on the lower surface 515 can be reversed from the force which generates the deformation which causes the face tangle when the multilayer film 511 is pressurized to be fixed to the rotor 505. Therefore, according to the present embodiment, the face tangle of the reflecting surface of the polygon mirror 5 can be reduced. With the reduction of the face tangle of the reflecting surface, the quality of the deflection device 50, the optical scanning apparatus 100 and the image forming apparatus 104 using the polygon mirror 5 can be improved.

Recently, manufacturing the polygon mirror 5 with a resin material instead of a conventional metal material is intended to reduce the manufacturing cost. Since the Young's modulus of a resin is often smaller than that of a metal, when the polygon mirror 5 made of a resin is attached to the rotor 505, the deformation which contributes to the face tangle of the reflecting surface generated on the polygon mirror 5 by the pressure of the pressing spring 509 may be larger than that of the conventional polygon mirror made of a metal. According to the present embodiment, even in the case of the polygon mirror 5 made of a resin, the face tangle of the reflecting surface can be reduced.

In the present embodiment, the dispersion in the reflection characteristics of the polygon mirrors 5 can be reduced by reducing the individual differences of the polygon mirrors 5 as described above. That is, when the volumes V1 and V2 are equal to each other, the warping manners of the polygon mirrors 5 includes one warping to the side of the upper surface 514, one warping to the side of the lower surface 515, one not warping, and the like, and individual differences are easily generated in the polygon mirrors 5. On the other hand, in the present embodiment, since the volume V1 and the volume V2 are different from each other, it is possible for the polygon mirror 5 to easily warp on one side of the upper surface 514 and the lower surface 515, thereby it is possible to reduce the individual differences in the polygon mirrors 5 and reduce the dispersion of the reflection characteristics. Further, since the volumes V1 and V2 are different from each other, the upper surface 514 and the lower surface 515 can be easily identified. Thus, the manufacturability, maintainability and the like of the deflection device 50 using the polygon mirror 5 can be improved.

The magnitude relationship between the volumes V1 and V2 can be determined depending on the type of the multilayer film 511. Specifically, when the multilayer film 511 has a tensile stress, the multilayer film 511 can be configured such that the volume V1 of the first region 517 is larger than the volume V2 of the second region 518. On the other hand, when the multilayer film 511 has a compressive stress, the multilayer film 511 can be configured such that the volume V2 of the second region 518 is larger than the volume V1 of the first region 517. By these configurations, the individual differences of the polygon mirrors 5 can be reduced. Furthermore, the face tangle of the reflecting surface generated when the polygon mirror 5 is pressurized to be fixed to the rotor 505 can be reduced.

For example, when the volume V2 is larger than the volume V1 in the case where the multilayer film 511 has a compressive stress, the volumes V1 and V2 preferably satisfy the following equation (1) and more preferably satisfy the following equation (2), as will be described later.

$$1 < V2/V1 < 2.4 \quad (1)$$

$$1 < V2/V1 < 1.94 \quad (2)$$

As will be described later, the multilayer film 511 can be configured to have a compressive stress or a tensile stress, as required, by appropriately selecting the materials of the individual films constituting the multilayer film 511, such as an adhesion layer 520, a reflecting layer 521, a protection layer 522, and the like, and the film forming method.

Note that the multilayer film 511 does not necessarily have both the first region 517 and the second region 518, but may have at least one of the first region 517 and the second region 518. Therefore, the multilayer film 511 may be formed on the plurality of side surfaces 510 and extend from the top of the plurality of side surfaces 510 to the top of either one of the upper surface 514 and the lower surface 515. The multilayer film 511 may extend from the top of the plurality of side surfaces 510 only over one of the top surface 514 and the lower surface 515, and in this case, the multilayer film 511 may be provided on a surface which is neither the plurality of side surfaces 510, the upper surface 514 nor the lower surface 515. That is, even when one of the volumes V1 and V2 is zero, the individual differences of the polygon mirrors 5 can be reduced as described above, and the face tangle of the reflecting surface can also be reduced.

Figure 4A:
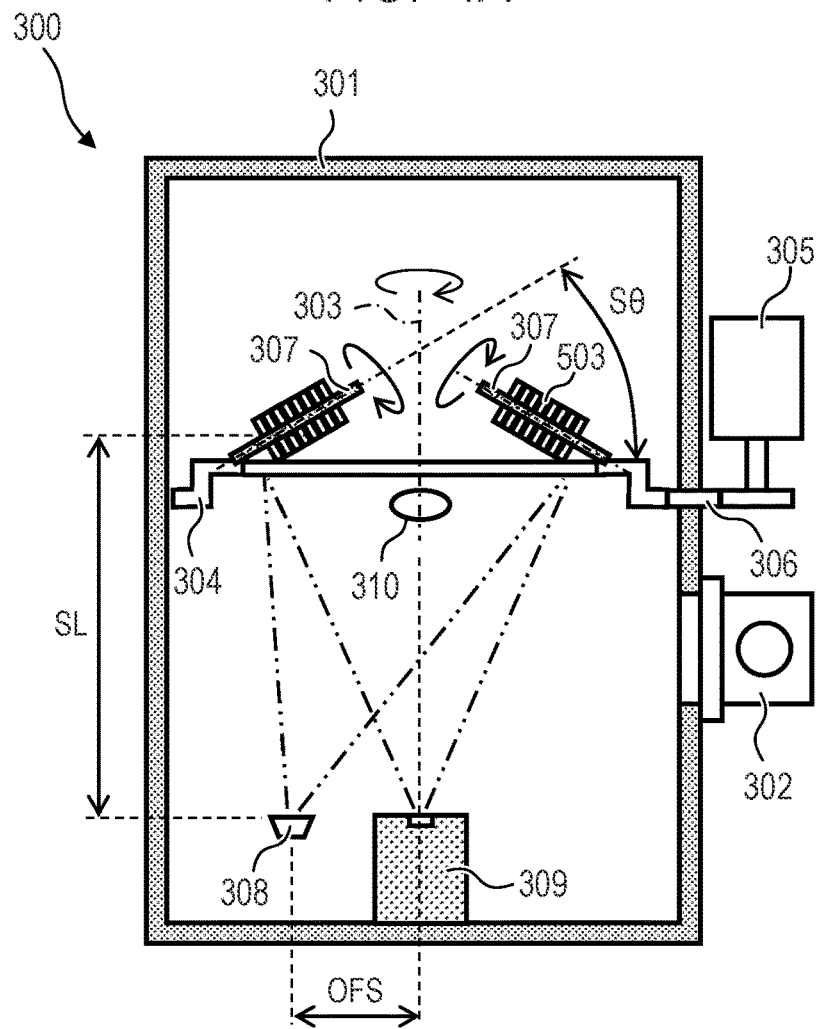
FIG. 4A is a schematic block diagram of an example of a film forming apparatus for forming a multilayer film of the polygon mirror according to the first embodiment of the present invention.
Figure 4B:
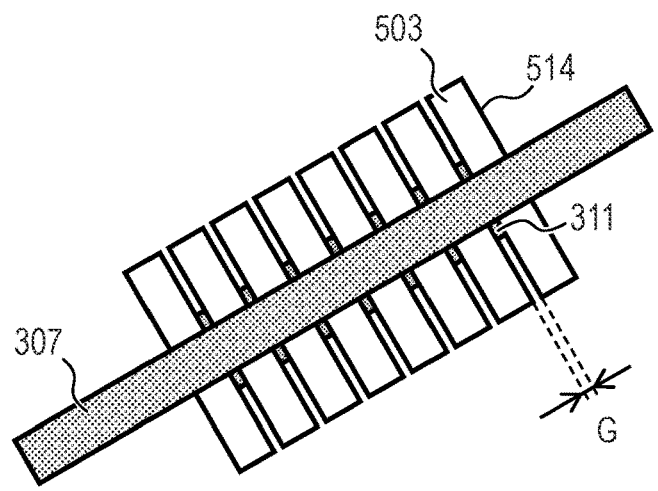
FIG. 4B is a schematic diagram of the example of the film forming apparatus for forming the multilayer film of the polygon mirror according to the first embodiment of the present invention.

Next, a film forming apparatus for forming the multilayer film 511 of the polygon mirror 5 according to the present embodiment will be described with reference to FIG. 4A and FIG. 4B. FIG. 4A is a schematic diagram illustrating a vacuum vapor deposition apparatus as an example of the film deposition apparatus according to the present embodiment. FIG. 4B is an enlarged cross-sectional view illustrating a state in which the base body 503 on which the multilayer film 511 is to be formed is disposed on a rotation axis component 307.

As illustrated in FIG. 4A, the vacuum vapor deposition apparatus 300 includes a film forming chamber 301, an exhaust system 302, a revolution component 304, a driving mechanism 305, a gear 306, a rotation axis component 307, a crucible 308, an ion gun 309, and a quartz film thickness sensor 310.

In the film forming chamber 301, the multilayer film 511 is formed on the base body 503 inside, and the inside can be maintained in a vacuum state. The exhaust system 302 includes a vacuum pump and the like, and is installed so as to exhaust the film forming chamber 301. The vacuum vapor deposition apparatus 300 has an Ar introduction line (not shown) for introducing oxygen gas into the film forming chamber 301 and an oxygen introduction line (not shown) for introducing oxygen gas into the film forming chamber 301.

In the film forming chamber 301, the revolution component 304 capable of revolution driving around a revolution axis 303 along the vertical direction is arranged. The revolution component 304 has an annular shape around the revolution axis 303. The revolution component 304 is driven via the gear 306 by the driving mechanism 305 to perform revolution driving. In the film forming chamber 301, the ion gun 309 for performing ion assist in the film formation by vapor deposition is disposed below the revolution axis 303 of the revolution component 304. The quartz film thickness sensor 310 for measuring the film thickness of the multilayer film 511 to be formed is disposed near the center lower side of the revolution component 304. Further, in the film forming chamber 301, the crucible 308 in which a vapor deposition material is contained is arranged on the side of the ion gun 309.

A plurality of the base bodies 503 on which the multilayer film 511 is to be formed are stacked on the rotating shaft component 307 so that the rotation shaft component 307 passes through the center hole 512. The rotation axis component 307 is installed on the revolution component 304 in a state where the plurality of base body 503 are stacked, and rotates the base body 503 by performing rotation drive by a driving mechanism (not shown). It should be noted that the base body 503 disposed on the rotation axis component 307 does not necessarily have to be a plurality, but may be one. The rotation axis component 307 is arranged inclined to the side of the revolution axis 303 at an angle S$\theta$ with respect to the horizontal direction. In the base body 503, the multilayer film 511 is formed in a state of being driven by the revolution by the revolution component 304 and the revolution around the rotation axis component 307. The base body 503 is arranged at a height SL from the crucible 308 in which a vapor deposition material to be a multilayer film 511 is stored. The crucible 308 is positioned at a distance OFS in the horizontal direction from the revolution axis 303.

As illustrated in FIG. 4B, the plurality of base bodies 503 are arranged at intervals of gaps G through spacers 311 so that the upper surface 514 faces upward in the axial direction of the rotation axis component 307 inclined at the angle S$\theta$. Although the gap G is formed by using the spacer 311 in FIG. 4B, the gap G may be formed by providing a step in the base body 503. Since the spacer 311 is not required by providing the step, the number of parts can be reduced.

Figure 5A:
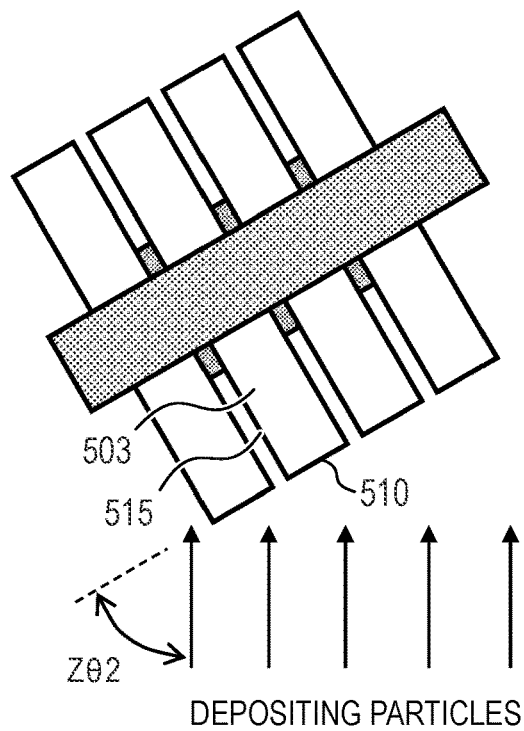
FIG. 5A is a cross-sectional view illustrating incident direction of depositing particles on the polygon mirror according to the first embodiment of the present invention.
Figure 5B:
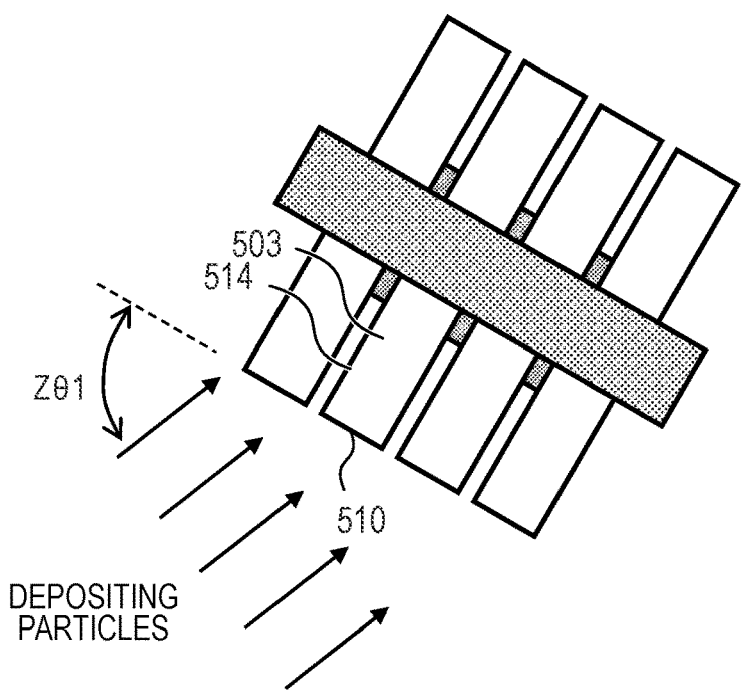
FIG. 5B is a cross-sectional view illustrating incident direction of the depositing particles on the polygon mirror according to the first embodiment of the present invention.

Next, the formation of the multilayer film 511 on the side surface 510, the upper surface 514 and the lower surface 515 of the base body 503 of the polygon mirror 5 will be described with reference to FIG. 5A and FIG. 5B. FIG. 5A is a cross-sectional view illustrating a state in which the multilayer film 511 is formed on the base body 503 above the crucible 308. FIG. 5B is a cross-sectional view illustrating a state in which the multilayer film 511 is formed on the base body 503 on the side opposite from above the crucible 308.

The crucible 308 is arranged at a position apart from the revolution axis 303 by the distance OFS in the horizontal direction. Therefore, as illustrated in FIG. 5A, when the multilayer film 511 is formed on the base body 503 above the crucible 308, the multilayer film 511 is formed on the side surfaces 510 and the lower surface 515. On the other hand, as illustrated in FIG. 5B, when the base body 503 is formed on the side opposite from above the crucible 308, the multilayer film 511 is formed on the side surfaces 510 and the upper surface 514.

An incident angle Z$\theta$1 of the depositing particles incident on the upper surface 514 is larger than an incident angle Z$\theta$2 of the depositing particles incident on the lower surface 515. Therefore, the lengths L11 to L14 of the first region 517 of the multilayer film 511 formed on the upper surface 514 are longer than the lengths L21 to L24 of the second region 518 of the multilayer film 511 formed on the lower surface 515. Since the incident angle Z$\theta$1 is larger than the incident angle Z$\theta$2, the film thickness of the first region 517 is thinner than that of the second region 518 in the multilayer film 511.

By adjusting the angle S$\theta$, the distance OFS, the height SL, and the gap G that determine the incident angles Z$\theta$1 and Z$\theta$2, the multilayer film 511 can be formed so that the length and the film thickness of the first region 517 and the second region 518 of the multilayer film 511 become desired values. Therefore, the volume V1 of the first region 517 obtained from the length and the film thickness of the first region 517, and the volume V2 of the second region 518 obtained from the length and the film thickness of the second region 518 can be set to desired values.

In the present embodiment, the case where the base body 503 is arranged in the axial direction of the rotation axis component 307 so that the upper surface 514 faces upward, so that the length of the film formation region of the upper surface 514 is made longer than the length of the film formation region of the lower surface 515 has been described. Conversely, the length of the film formation region of the lower surface 515 can be made longer than the length of the film formation region of the upper surface 514. In this case, the base body 503 may be disposed in the axial direction of the rotation axis component 307 so that the lower surface 515 faces upward.

Figure 6:
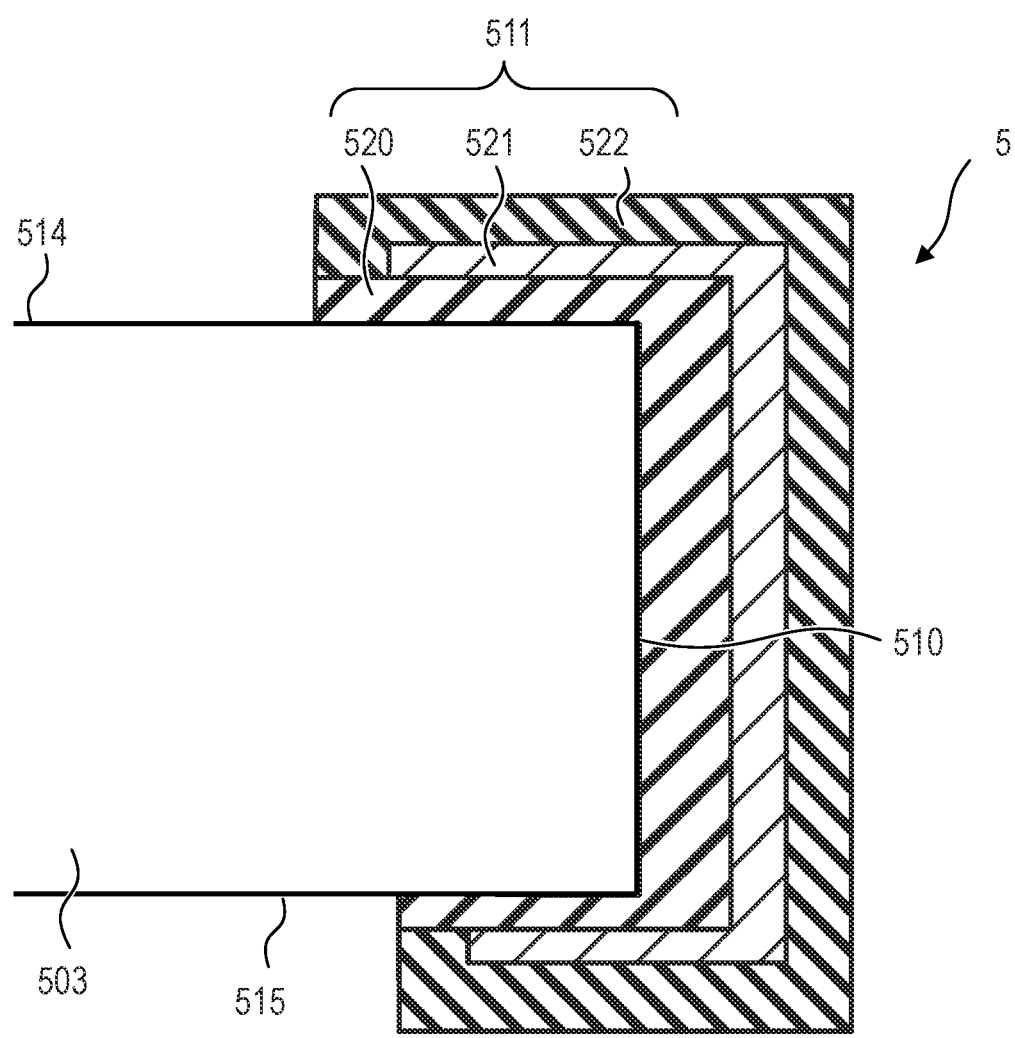
FIG. 6 is a cross-sectional view illustrating a layer structure of the multilayer film in the polygon mirror according to the first embodiment of the present invention.

Next, the layer structure of the multilayer film 511 formed using the vacuum vapor deposition apparatus 300 will be described with reference to FIG. 6. FIG. 6 is a cross-sectional view illustrating the layer structure of the multilayer film 511. The multilayer film 511 can be formed by using another film forming apparatus such as a sputtering apparatus, in addition to the vacuum vapor deposition apparatus 300.

As illustrated in FIG. 6, the multilayer film 511 is continuously formed on the side surfaces 510, the peripheral edge of the upper surface 514, and the peripheral edge of the lower surface 515 of the base body 503 of the polygon mirror 5. The multilayer film 511 has a layer structure in which an adhesion layer 520, a reflecting layer 521 and a protection layer 522 are sequentially laminated from the side of each surface of the side surface 510, the upper surface 514 and the lower surface 515 toward the outside. The adhesion layer 520 is a layer for enhancing adhesion between the base body 503 and the reflecting layer 521. The reflecting layer 521 is a layer for reflecting laser beam, which is light emitted from the light source 1. The protection layer 522 is a layer for protecting the reflecting layer 521 from corrosion, damage, and the like.

The adhesion layer 520 and the protection layer 522 are each formed of, for example, a dielectric material. Specifically, the material of each of the adhesion layer 520 and the protection layer 522 is selected from, for example, silicon oxide, magnesium fluoride, magnesium oxide, aluminum oxide, tantalum oxide, titanium oxide, zirconium oxide, niobium oxide or mixtures thereof. The adhesion layer 520 and the protection layer 522 may be formed of the same material or different materials. The reflecting layer 521 is formed of, for example, a metal material. Specifically, the material of the reflecting layer 521 is selected from, for example, aluminum, copper, silver, gold or alloys thereof.

As illustrated in FIG. 6, the reflecting layer 521 is preferably formed to be covered with the adhesion layer 520 and the protection layer 522. By forming in this manner, it is possible to suppress or prevent the moisture contained in the atmosphere or the moisture absorbed by the base body 503 from reaching the reflecting layer 521, thereby improving the durability of the reflecting layer 521. Such a layer structure of the multilayer film 511 can be realized by making the film formation pressure of the adhesion layer 520 and the protection layer 522 higher than that of the reflecting layer 521 in the film formation of the multilayer film 511. The reflecting layer 521 is formed so as to be covered with the adhesion layer 520 and the protection layer 522 by increasing the film forming pressure of each of the adhesion layer 520 and the protection layer to scatter the vapor deposition particles when forming the films of the adhesion layer and the protection layer 522.

Although FIG. 6 shows a case where the protection layer 522 is formed on the surface of the adhesion layer 520, the protection layer 522 may also be formed to cover the adhesion layer 520. If the reflecting layer 521 is formed on the base body 503 via the adhesion layer 520 so that the reflecting layer 521 as a metal layer does not contact the base body 503, the durability of the reflecting layer 521 is improved, and the protection layer 522 may be formed to cover the adhesion layer 520.

Further, the number of layers of each of the adhesion layer 520 and the protection layer 522 need not be limited to one layer. The adhesion layer 520 and the protection layer 522 may be formed as two or more multilayer films.

The material and the number of layers of the adhesion layer 520 and the protection layer 522 can be selected from the viewpoint of the material of the reflecting layer 521, the film stress of the dielectric material, the durability, and the like.

Next, the operation of the vacuum vapor deposition apparatus 300 when the multilayer film 511 is formed will be described. First, in the film forming chamber 301, the rotation axis component 307 in which the base bodies 503 are stacked and arranged is attached to the revolution component 304 and set. A granular material is put in the crucible 308 as a deposition material. A necessary number of the crucibles 308 are installed in an electron gun crucible exchange mechanism (not shown) according to materials constituting the adhesion layer 520, the reflecting layer 521 and the protection layer 522. The electron gun crucible exchange mechanism exchangeably mounts a plurality of crucibles 308 each corresponding to the material of each layer on the electron gun. The quartz film thickness sensor 310 for film thickness monitoring is arranged near the revolution component 304.

Next, the inside of the film forming chamber 301 is evacuated to, for example, a high vacuum region near $2 \times 10^{-3}$ Pa in an unheated state by using the exhaust system 302. After the film forming chamber 301 is in a high vacuum state, oxygen, Ar as an inert gas or both are introduced into the ion gun 309 to discharge the ion gun 309.

In parallel with the discharge of the ion gun 309, the vapor deposition material in the crucible 308 is preheated by the electron gun. When the ion gun 309 is stabilized, oxygen is introduced into the film forming chamber 301. The rotation of the revolution component 304 and the rotation of the base bodies 503 by the rotation axis component 307 are started. During the formation of the adhesion layer 520, the reflecting layer 521 and the protection layer 522, the revolution of the revolution component 304 and the rotation of the base bodies 503 are continuously performed.

A shutter (not shown) is opened when the vacuum pressure in the film forming chamber 301 becomes, for example, about $1 \times 10^{-2}$ to $3 \times 10^{-2}$ Pa. Using the crucible 308 containing the material of the adhesion layer 520, ion assisted vapor deposition with oxygen ion is performed while heating the material in the crucible 308 with the electron gun to form the adhesion layer 520.

After the film formation of the adhesion layer 520, introduction of oxygen or Ar gas is stopped. Further, the crucible 308 containing the material of the adhesion layer 520 is replaced with the crucible 308 containing the material of the reflecting layer 521 by the electron gun crucible exchange mechanism. Next, the inside of the film forming chamber 301 is reduced in pressure to a pressure of $9 \times 10^{-3}$ Pa or less, and the reflecting layer 521 is formed by heating the material inside the crucible 308 by the electron gun while using the crucible 308 containing the material of the reflecting layer 521. At this time, oxygen is not introduced.

After the reflecting layer 521 is formed, the crucible 308 containing the material of the reflecting layer 521 is exchanged to the crucible 308 containing the material of the protection layer 522 by an electron gun crucible exchange mechanism. The protection layer 522 and the adhesion layer 520 may be layers of the same material or different materials. For this reason, the crucible 308 similar to the crucible 308 used for forming the adhesion layer 520 may be used for forming the protection layer 522, or the different crucible 308 may be used. Next, a film is formed in the same manner as that of the adhesion layer 520 to form the protection layer 522.

Note that, in order to uniformize the characteristics of the multilayer film 511 obtained on each of the plurality of side surfaces 510 of the base body 503, it is preferable to deposit the multilayer film 511 while orbiting the revolution component 304 at a speed of about 5 to 15 rpm. The rotation speed of the base body 503 is preferably at least twice the revolution speed of the revolution component 304.

In the vacuum vapor deposition apparatus 300 described above, deposition is performed using the electron gun, but deposition may be performed using resistance heating. For example, when a film of SiO is formed, resistance heating is preferably used. Heating by the electron gun and the resistance heating can be used separately depending on the material.

Example 1

An example of the first embodiment will be described below. The vacuum vapor deposition apparatus used was a vacuum vapor deposition apparatus manufactured by Shincron Co., Ltd. The basic specifications are as follows.

Vacuum chamber: inner diameter φ 850 mm, revolution capable at 3 to 15 rpm
Evaporation source: 10 kW electron gun
Ion guns: end-hole type ion gun
Film thickness control: vapor deposition rate control and film thickness control by a quartz film thickness meter
Introduced gases: oxygen and argon (inside of the ion gun), oxygen (in the vacuum chamber)

Geometric arrangement conditions and the like were set as follows.

Sθ: 20°
OFS: 270 mm
SL: 650 mm
G: 0.2 mm
Arrangement of the base body 503: disposed in the direction of the rotation axis so that the upper surface 514 faces upward
Size of the base body 503: 15 mm×15 mm In the base body 503 of the present example, deformation generated when the upper surface 514 is pressurized and fixed by using the pressing spring 509 without forming the multilayer film 511 is in a direction from the lower surface 515 to the upper surface 514. In order to suppress this deformation, the base body 503 is disposed in the direction of the rotation axis so that the upper surface 514 faces upward.

Under the above conditions, the multilayer film 511 was formed on four surfaces of the side surface of the hexahedron base body 503 formed by molding a cycloolefin resin (COP resin) by a vapor deposition method. The film material and the film thickness of the multilayer film 511, and the approximate film formation conditions are shown in Table 1.

mm. At this time, the thickness of the multilayer film 511 was 120 nm and 290 nm in the first region 517 and the second region 518, respectively, and the volume V1 of the first region 517 was 0.0049 $mm^3$ and the volume V2 of the second region 518 was 0.0070 $mm^3$.

In the present example, $Ta_2O_5$ was used as the fourth layer, which is a high refraction layer included in the protection layer 522. As the high refractive index material, $TiO_2$, $ZrO_2$, $Ta_2O_5$ or a mixture thereof can be used. In vacuum vapor deposition, weak tensile stress to compressive stress is generated as a film stress of Ta $Ta_2O_5$, but in ion-assisted vapor deposition, a strong compressive stress can be generated. Therefore, there is an advantage that the compressive stress of the multilayer film is enhanced as compared with the case where other materials are used as the high refractive index material, and thus $Ta_2O_5$ was used.

Further, in the present example, $SiO_2$ was used for the adhesion layer 520 and the third and fifth low refractive index layers included in the protection layer 522. $SiO_2$ can cause compressive stress by ion-assisted vapor deposition as in $Ta_2O_5$.

Note that the combination of the adhesion layer 520 and the protection layer 522 is not limited to $SiO_2$ and $Ta_2O_5$. SiO (silicon monoxide) may be used instead of $SiO_2$ (silicon dioxide). The combination of SiO and $Ta_2O_5$ by ion-assisted vapor deposition may be used, since SiO also generates compressive stress in vacuum vapor deposition without ion assist. Note that $SiO_2$ and SiO may be collectively referred to as silicon oxide.

Materials other than $Ta_2O_5$, such as $TiO_2$ or $ZrO_2$, may be used as the high refractive index material. $TiO_2$ and $ZrO_2$ show tensile stress even when they are formed by ion-assisted vapor deposition, but tensile stress of $TiO_2$ and $ZrO_2$ can be relaxed by using them in combination with SiO showing compressive stress. Therefore, even when $TiO_2$ or $ZrO_2$ is used, the film stress of the multilayer film 511 becomes compressive stress. The same is true if $SiO_2$ by ion-assisted vapor deposition is used instead of SiO. The use of ion-assisted vapor deposition may be determined in consideration of the film stress of the material. If ion-assisted vapor deposition is not used, the running cost of the apparatus can be suppressed.

The adhesion layer 520 and the protection layer 522 may each be made of a mixed material. As the material of each layer, for example, at least one or more kinds of materials

TABLE 1

|  | Layer No. | Material | Film thickness (nm) | Film forming rate (Å/s) | Film forming pressure (Pa) | Introduced gas |
|---|---|---|---|---|---|---|
|  | Base body | COP resin | — | — | — | — |
| Adhesion layer | First layer | $SiO_2$ | 150 | 10 | $1.5 \times 10^{-2}$ | Oxygen |
| Reflecting layer | Second layer | Al | 120 | 15 | $5.0 \times 10^{-3}$ | None |
| Protection layer | Third layer | $SiO_2$ | 160 | 10 | $1.5 \times 10^{-2}$ | Oxygen |
|  | Fourth layer | $Ta_2O_5$ | 75 | 4 | $2.5 \times 10^{-2}$ | Oxygen |
|  | Fifth layer | $SiO_2$ | 160 | 10 | $1.5 \times 10^{-2}$ | Oxygen |

As a result of the film formation under the above conditions, in the present example, it was possible to obtain the polygon mirror 5 in which the average value of the lengths L11 to L14 of the first region 517 of the upper surface 514 is about 0.7 mm and the average value of the lengths L21 to L24 of the second region 518 of the lower surface 515 is 0.4 from silicon oxide, magnesium fluoride, magnesium oxide, aluminum oxide, tantalum oxide, titanium oxide, zirconium oxide and niobium oxide are selected in consideration of film stress.

Further, the number of layers of the multilayer film 511 is not limited to five, and the number of layers may be determined in accordance with the film stress, and the multilayer film may be formed of three layers. In the case of three layers, the material cost can be reduced. In the case of the three layers, it is preferable to use SiO capable of increasing compressive stress or $SiO_2$ by ion-assisted vapor deposition as the material of the adhesion layer 520 and the protection layer 522.

The multilayer film 511 formed in the present example showed compressive stress. In the present example, since the volume V1 of the first region 517 was 0.0049 $mm^3$ and the volume V2 of the second region 518 was 0.0070 $mm^3$ and V2>V1, the compressive stress generated in the second region 518 increased. Therefore, the resultant force between the force acting on the upper surface 514 and the force acting on the lower surface 515 was reversed to the force generating deformation generated when the polygon mirror 5 was pressurized and fixed, and the face tangle of the reflecting surface of the polygon mirror 5 could be reduced.

Example 2

The present example shows a case where a different geometry from that of Example 1 was adopted. The vapor deposition apparatus used in the present example was the vacuum vapor deposition apparatus manufactured by Shincron Co., Ltd., as in Example 1. The basic specifications were the same as those of Example 1.

Geometric arrangement conditions and the like were set as follows.
Sθ: 15°
OFS: 285 mm
SL: 500 mm
G: 0.2 mm
Arrangement of the base body 503: disposed in the direction of the rotation axis so that the upper surface 514 faces upward
Size of the base body 503: 15 mm×15 mm In the present example, the same film formation as in Table 1 of Example 1 was performed in the above arrangement. As a result, in the present example, it was possible to obtain the polygon mirror 5 in which the average value of the lengths L11 to L14 of the first region 517 of the upper surface 514 is 0.36 mm and the average value of the lengths L21 to L24 of the second region 518 of the lower surface 515 is 0.44 m. At this time, the thicknesses of the multilayer film 511 was 170 nm and 280 nm in the first region 517 and the second region 518, respectively, and the volume V1 of the first region 517 was 0.0036 $mm^3$ and the volume V2 of the second region 518 was 0.0070 $mm^3$. Further, the multilayer film 511 exhibited compressive stress in the same manner as in Example 1.

FIG. 7 is a graph showing a result of examining the face tangle generated in the polygon mirror 5 obtained by forming the multilayer films 511 by the vapor deposition apparatus of Example 1 and Example 2, respectively. In the polygon mirror 5 of Example 1, V2/V1 is 1.43, and in the polygon mirror 5 of Example 2, V2/V1 is 1.94. As shown in FIG. 7, if the volume V2 is larger than the volume V1, the face tangle of the polygon mirror 5 is improved as compared with the case where the multilayer film 511 is not formed. It can be seen that the effect of improving the face tangle is obtained, preferably in the range of 1<V2/V1<2.4, and more preferably in the range of 1<V2/V1<1.94.

Example 3

In the present example, the case where the multilayer film 511 had tensile stress rather than compressive stress is shown. The vapor deposition apparatus used in this embodiment is a vacuum vapor deposition apparatus manufactured by Shincron Co., Ltd., as in Example 1. The basic specifications were the same as those of Example 1.

Geometric arrangement conditions and the like were set as follows.
Sθ: 20°
OFS: 270 mm
SL: 650 mm
G: 0.2 mm
Arrangement of the base body 503: disposed in the direction of the rotation axis so that the lower surface 515 faces upward
Size of the base body 503: 15 mm×15 mm The film material and the film thickness of the multilayer film 511, and the approximate film formation conditions are shown in Table 2.

TABLE 2

| | Layer No. | Material | Film thickness (nm) | Film forming rate (Å/s) | Film forming pressure (Pa) | Introduced gas |
|---|---|---|---|---|---|---|
| | Base body | COP resin | — | — | — | — |
| Adhesion layer | First layer | $SiO_2$ | 150 | 10 | $1.5 \times 10^{-2}$ | Oxygen |
| Reflecting layer | Second layer | Al | 120 | 15 | $5.0 \times 10^{-3}$ | None |
| Protection layer | Third layer | $SiO_2$ | 160 | 10 | $1.5 \times 10^{-2}$ | Oxygen |
| | Fourth layer | $Ta_2O_5$ | 75 | 4 | $2.5 \times 10^{-2}$ | Oxygen |
| | Fifth layer | $MgF_2$ | 165 | 4 | $1.5 \times 10^{-2}$ | Oxygen |

$MgF_2$ employed in the material of the fifth layer in the present example shows strong tensile stress even in ion-assisted vapor deposition. Therefore, even if a layer of $SiO_2$ by ion-assisted vapor deposition having compressive stress was used, the entire multilayer film 511 exhibited tensile stress. In order to make the resultant force between the force acting on the upper surface 514 and the force acting on the lower surface 515 opposite to the force generating deformation when the base body 503 was fixed under pressure, the base body 503 was arranged in the rotation axis direction so that the lower surface 515 faces upward. Since the refractive index of $MgF_2$ is smaller than that of $SiO_2$, there are advantages such as that the reflectivity of the multilayer film 511 can be increased.

As a result of the film formation under the above conditions, it was possible to obtain a polygon mirror 5 having an average value of 0.4 mm for the length L11 to L14 of the film formation region of the upper surface 514 and an average value of 0.7 mm for the length L21 to L24 of the film formation region of the lower surface 515. At this time, the thickness of the multilayer film 511 was 290 nm and 120 nm, respectively, and the volume V1 of the first region was 0.0070 mm$^3$ and the volume V2 of the second region was 0.0049 mm$^3$.

In the base body 503 of the present example, the deformation generated when the upper surface 514 was pressurized and fixed using the pressing spring 509 without forming the multilayer film 511 was in the direction from the lower surface 515 to the upper surface 514 as in the case of Example 1.

The multilayer film 511 formed in the present example exhibited tensile stress. In the present example, since the volume V1 of the first region 517 was larger than the volume V2 of the second region 518 (V1>V2), the tensile stress generated in the first region 517 increased. Therefore, in the present example, the resultant force between the force acting on the upper surface 514 and the force acting on the lower surface 515 was opposite to the force which generated the deformation when the polygon mirror 5 was fixed under pressure, and the face tangle of the reflecting surface of the polygon mirror 5 could be reduced.

Since the deformation of the base body 503 shown in Examples 1 to 3 that occurred when the base body 503 was pressurized and fixed was in the direction from the lower surface 515 to the upper surface 514, the base body 503 was arranged in the rotation axis direction so that the upper surface 514 faced upward in Examples 1 and 2. In Example 3, the base body 503 was arranged in the rotation axis direction so that the lower surface 515 faced upward. It is also conceivable that the deformation generated when it is pressurized and fixed is opposite to these directions. In this case, the multilayer film 511 may be formed by arranging the base body 503 in the opposite direction in the direction of the rotation axis. As a result, effects similar to those obtained in Examples 1 to 3 can be obtained.

Second Embodiment

The optical scanning apparatus 100 according to the first embodiment can be used as an optical scanning unit in an image forming apparatus. In the present embodiment, an image forming apparatus in which the optical scanning apparatus 100 according to the first embodiment is used as an optical scanning unit will be described with reference to FIG. 8A and FIG. 8B.

[Monochrome Image Forming Apparatus]

Figure 8B:
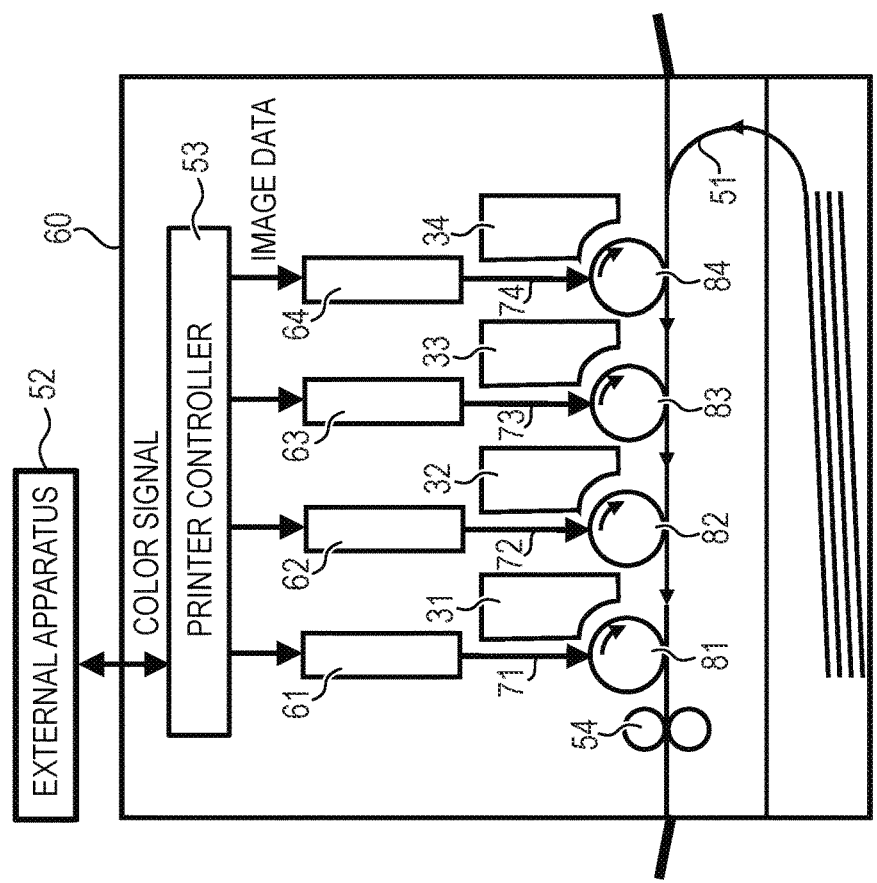
FIG. 8B is a sub scanning cross-sectional view of an essential part of an image forming apparatus according to the second embodiment of the present invention.
Figure 8A:
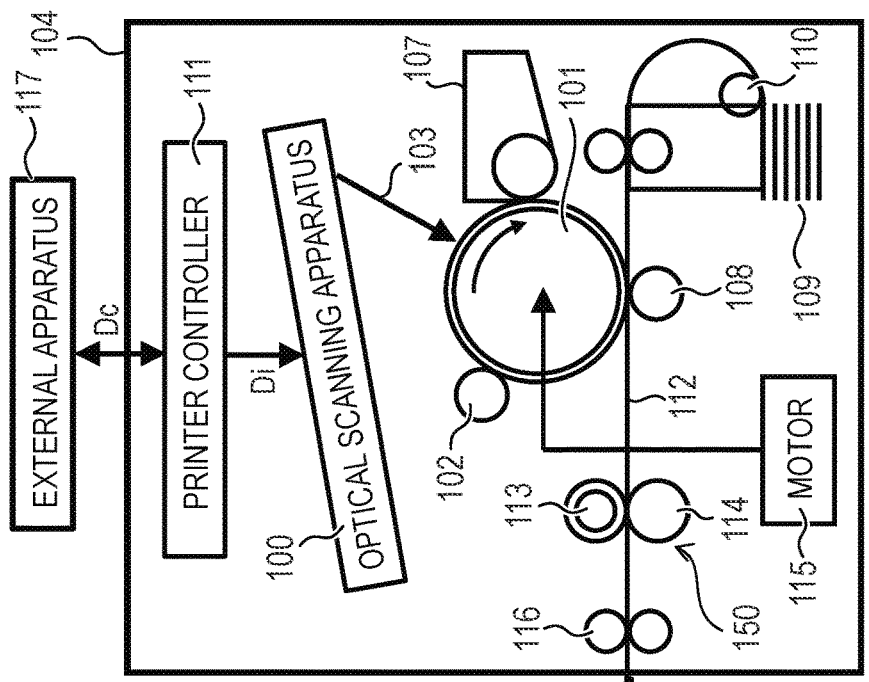
FIG. 8A is a sub scanning cross-sectional view of an essential part of an image forming apparatus according to a second embodiment of the present invention.

FIG. 8A is a sub scanning cross-sectional view of an essential part of a monochrome image forming apparatus 104 in which the optical scanning apparatus 100 according to the first embodiment is mounted as an optical scanning unit.

Code data Dc output from an external apparatus 117 such as a personal computer or the like is input to the monochrome image forming apparatus 104. The code data Dc is converted into image data (dot data) Di by the printer controller 111 in the image forming apparatus 104. The image data Di is input to the optical scanning apparatus 100. Light beam 103 modulated in accordance with the image data is emitted from the optical scanning apparatus 100, and the photosensitive surface of the photosensitive drum 101 is scanned in the main scanning direction by the light beam 103.

The photosensitive drum 101 as an electrostatic latent image bearing member (photosensitive member) is rotated clockwise by a motor 115. With this rotation, the photosensitive surface of the photosensitive drum 101 moves in the sub scanning direction orthogonal to the main scanning direction with respect to the light beam 103. A charging roller 102 for uniformly charging the surface of the photosensitive drum 101 is provided above the photosensitive drum 101 so as to contact with the surface. The surface of the photosensitive drum 101 charged by the charging roller 102 is irradiated with the light beam 103 scanned by the optical scanning apparatus 100.

As described above, the light beam 103 is modulated based on the image data Di, and by irradiating the light beam 103, an electrostatic latent image is formed on the surface of the photosensitive drum 101. The electrostatic latent image is developed as a toner image by a developing device 107 arranged so as to contact with the photosensitive drum 101 further downstream in the rotational direction of the photosensitive drum 101 than the irradiation position of the light beam 103.

The toner image developed by the developing device 107 is transferred onto a sheet 112 as a material to be transferred by a transfer roller (transfer unit) 108 disposed below the photosensitive drum 101 so as to face the photosensitive drum 101. Although the sheet 112 is stored in a sheet cassette 109 in front of the photosensitive drum 101 (right side in FIG. 8A), the sheet 112 can be fed manually. A sheet feed roller 110 is disposed at the end of the sheet cassette 109, and the sheet 112 in the sheet cassette 109 is fed to the transport path.

The sheet 112 onto which the unfixed toner image has been transferred as described above is further transferred to a fixing device 150 behind the photosensitive drum 101 (left side in FIG. 8A). The fixing device 150 includes a fixing roller 113 having a fixing heater (not shown) therein and a pressure roller 114 disposed so as to be in pressure contact with the fixing roller 113. The unfixed toner image on the sheet 112 is fixed by heating the sheet 112 transferred from the transfer section while pressurizing the sheet at the pressure contact portion between the fixing roller 113 and the pressure roller 114. Further, a sheet discharge roller 116 is disposed behind the fixing device 150, and the fixed sheet 112 is discharged to the outside of the monochrome image forming apparatus 104.

Note that the printer controller 111 not only converts the data but also controls the motor 115 and other components in the monochrome image forming apparatus 104 and the deflection device 50 and the like in the optical scanning apparatus 100.

[Color Image Forming Apparatus]

FIG. 8B is a sub scanning cross-sectional view of an essential part of an image forming apparatus 60 in which the optical scanning apparatuses 100 according to the first embodiment are mounted as optical scanning apparatuses 61 to 64.

The image forming apparatus 60 is a tandem type color image forming apparatus in which the four optical scanning apparatuses are arranged in parallel and each of the optical scanning apparatuses records image information on a photosensitive drum surface, which is an image bearing member. The image forming apparatus 60 includes the optical scanning apparatuses 61, 62, 63 and 64 which are the optical scanning apparatuses 100 according to the first embodiment, and photosensitive drums 81, 82, 83 and 84 as image bearing members. Further, the image forming apparatus 60 includes developing devices 31, 32, 33 and 34, a transfer belt 51, a printer controller 53, and a fixing device 54.

The image forming apparatus 60 receives color signals (code data) of R (red), G (green) and B (blue) from an external apparatus 52 such as a personal computer, or the like. These color signals are converted into image data of C (cyan), M (magenta), Y (yellow) and K (black) by the printer controller 53 in the apparatus. These image data are input to the optical scanning apparatuses 61, 62, 63 and 64 as image signals and image information, respectively.

The light beams 71, 72, 73 and 74 modulated according to the image data of respective colors are emitted from the optical scanning apparatuses 61, 62, 63 and 64. The photosensitive surfaces of the photosensitive drums 81, 82, 83 and 84 are scanned in the main scanning direction by these light beams.

In the image forming apparatus 60, for example, image signals of C (cyan) are inputted to the optical scanning apparatus 61, image signals of M (magenta) are inputted to the optical scanning apparatus 62, image signals of Y (yellow) are inputted to the optical scanning apparatus 63, and image signals of K (black) are inputted to the optical scanning apparatus 64. Then, the optical scanning apparatus 61, 62, 63 and 64 records the image signals on the photosensitive surfaces of the photosensitive drums 81, 82, 83 and 84 in parallel with each other to print a color image at high speed.

As described above, the image forming apparatus 60 forms electrostatic latent images of respective colors on the photosensitive surfaces of the corresponding photosensitive drums 81, 82, 83 and 84 by using the light beams based on the respective image data by the four optical scanning apparatuses 61, 62, 63 and 64.

Thereafter, the electrostatic latent images of the respective colors are developed into the respective color toner images by the developing devices 31, 32, 33 and 34, and the developed respective color toner images are multiply transferred to the transferred material transferred by the transfer belt 51 by the transferring device. The transferred toner image is fixed by the fixing device 54 to form one full-color image.

As the external apparatus 52, for example, a color image reading apparatus equipped with a CCD sensor may be used. In this case, the color image reading apparatus and the color image forming apparatus 60 constitute a color digital copying machine.

The image forming apparatus 60 is not limited to the configuration of the four optical scanning apparatuses and the four photosensitive drums. For example, the image forming apparatus 60 may have a configuration with only the single optical scanning apparatus and the single photosensitive drum. Further, the image forming apparatus 60 may have a configuration with the two, three, or five or more optical scanning apparatuses and the two, three, or five or more photosensitive drums.

In the above description, the image forming apparatuses 60 and 104, which are printers, are used as examples, but the image forming apparatuses are not limited thereto. In addition to the printers, the image forming apparatus may be, for example, a display having a scanning mechanism including the optical scanning apparatus 100 and a display controller. In a display, the scanning mechanism including the optical scanning apparatus 100 forms an image by projecting laser beam corresponding to image data while scanning, for example, in a main scanning direction and a sub scanning direction, in accordance with control by the display controller. The optical scanning apparatus 100 in the scanning mechanism can scan the laser beam in the main scanning direction.

According to the present invention, it is possible to provide a technology which is advantageous in reducing individual differences in polygon mirrors.

It is also possible to provide a technology which is advantageous for improving the quality of a deflection device, an optical scanning apparatus and an image forming apparatus using the polygon mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-069963, filed Apr. 16, 2021, which is hereby incorporated by reference herein in its entirety.

What is claimed is:

1. A polygon mirror comprising:
   a base body having a plurality of side surfaces, a first surface adjacent to the plurality of side surfaces, and a second surface adjacent to the plurality of side surfaces and opposite to the first surface; and
   a film formed on the plurality of side surfaces and extending from the plurality of side surfaces over the first surface and the second surface,
   wherein the film comprises:
      a first region formed on the first surface along the plurality of side surfaces; and
      a second region formed on the second surface along the plurality of side surfaces,
      wherein a first volume of the first region and a second volume of the second region are different from each other.

2. The polygon mirror according to claim 1, wherein the film is a multilayer film.

3. The polygon mirror according to claim 2, wherein the multilayer film has a reflecting layer that reflects light, an adhesion layer formed between the base body and the reflecting layer, and a protection layer formed on the reflecting layer.

4. The polygon mirror according to claim 3, wherein the reflecting layer is covered with the adhesion layer and the protection layer.

5. The polygon mirror according to claim 3, wherein the adhesion layer is a layer of silicon oxide.

6. The polygon mirror according to claim 3, wherein the protection layer includes a layer of silicon oxide.

7. The polygon mirror according to claim 3, wherein the protection layer comprises a layer of magnesium fluoride.

8. The polygon mirror according to claim 1, wherein the base body is made of a resin.

9. A deflection device comprising:
   the polygon mirror according to claim 1;
   a driving unit configured to rotate the polygon mirror about an axis passing through a center of the first surface and a center of the second surface as a rotation center; and
   a fixing unit that fixes the polygon mirror to the driving unit with the second surface facing the driving unit.

10. The deflection device according to claim 9, wherein the fixing unit fixes the polygon mirror to the driving unit by pressurizing the first surface.

11. An optical scanning apparatus comprising:
   the deflection device according to claim 9 configured to deflect a light beam to scan a surface to be scanned in a main scanning direction; and
   an imaging optical system configured to guide the light beam deflected by the deflection device to the surface to be scanned.

12. An image forming apparatus comprising:
the optical scanning apparatus according to claim 11;
a developing unit configured to develop an electrostatic latent image formed on the surface to be scanned by the optical scanning apparatus as a toner image;
a transfer unit configured to transfer the developed toner image to a material to be transferred; and
a fixing unit configured to fix the transferred toner image to the material to be transferred.

13. An image forming apparatus comprising:
the optical scanning apparatus according to claim 11; and
a printer controller configured to convert a signal outputted from an external apparatus into image data and input the image data to the optical scanning apparatus.

14. A deflection device comprising:
the polygon mirror according to claim 1;
a driving unit configured to rotate the polygon mirror about an axis passing through a center of the first surface and a center of the second surface as a rotation center; and
a fixing unit that fixes the polygon mirror to the driving unit with the second surface facing the driving unit,
wherein the film has a compressive stress, and
wherein the second volume is larger than the first volume.

15. The deflection device according to claim 14, wherein when the first volume is V1 and the second volume is V2, the first volume and the second volume are such that 1<V2/V1<2.4.

16. A deflection device comprising:
the polygon mirror according to claim 1;
a driving unit configured to rotate the polygon mirror about an axis passing through a center of the first surface and a center of the second surface as a rotation center; and
a fixing unit that fixes the polygon mirror to the driving unit with the second surface facing the driving unit,
wherein the film has a tensile stress, and
wherein the first volume is larger than the second volume.

17. A polygon mirror comprising:
a base body having a plurality of side surfaces, a first surface adjacent to the plurality of side surfaces, and a second surface adjacent to the plurality of side surfaces and opposite to the first surface; and
a film formed on the plurality of side surfaces and extending from the plurality of side surfaces over either one of the first surface and the second surface,
wherein the base body is made of a resin.

18. The polygon mirror according to claim 17, wherein the film is a multilayer film.

19. The polygon mirror according to claim 18, wherein the multilayer film has a reflecting layer that reflects light, an adhesion layer formed between the base body and the reflecting layer, and a protection layer formed on the reflecting layer.

20. The polygon mirror according to claim 19, wherein the reflecting layer is covered with the adhesion layer and the protection layer.

* * * * *